United States Patent
Okamoto et al.

(10) Patent No.: US 7,995,252 B2
(45) Date of Patent: Aug. 9, 2011

(54) IMAGE READING APPARATUS

(75) Inventors: Tatsuki Okamoto, Tokyo (JP); Hiroshi Hasegawa, Tokyo (JP); Kazuya Makabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 908 days.

(21) Appl. No.: 11/917,205

(22) PCT Filed: May 18, 2006

(86) PCT No.: PCT/JP2006/309904
§ 371 (c)(1),
(2), (4) Date: Dec. 12, 2007

(87) PCT Pub. No.: WO2007/029377
PCT Pub. Date: Mar. 15, 2007

(65) Prior Publication Data
US 2009/0128866 A1    May 21, 2009

(30) Foreign Application Priority Data
Sep. 8, 2005  (JP) ................................ 2005-260953

(51) Int. Cl.
*H04N 1/04* (2006.01)
(52) U.S. Cl. ........ 358/487; 358/475; 358/484; 358/483; 358/482; 358/474; 358/496; 358/506; 358/509; 358/505
(58) Field of Classification Search .................. 358/484, 358/475, 487, 509, 506, 482, 483, 512–514, 358/474, 496, 505; 250/227.11, 234–236, 250/216, 205, 578.1; 355/67, 68, 70
See application file for complete search history.

(56) References Cited

U.S. PATENT DOCUMENTS

| | | | | |
|---|---|---|---|---|
| 5,136,150 A | * | 8/1992 | Fukushima et al. | 250/208.1 |
| 5,696,607 A | * | 12/1997 | Yamana et al. | 358/474 |
| 5,926,286 A | * | 7/1999 | Fujieda | 358/475 |
| 6,072,171 A | | 6/2000 | Nakamura et al. | |
| 6,091,848 A | | 7/2000 | Yamamoto | |
| 7,173,743 B2 | | 2/2007 | Yamazaki | |
| 7,538,911 B2 | * | 5/2009 | Sakurai et al. | 358/475 |
| 7,548,352 B2 | * | 6/2009 | Sakurai et al. | 358/475 |
| 7,760,403 B2 | * | 7/2010 | Sakurai | 358/484 |
| 7,855,815 B2 | * | 12/2010 | Hayashide et al. | 358/484 |
| 2005/0088705 A1 | * | 4/2005 | Okamoto et al. | 358/474 |

FOREIGN PATENT DOCUMENTS

| | | | |
|---|---|---|---|
| EP | 1 104 163 A2 | 5/2001 | |
| JP | 1-74660 U | 5/1989 | |
| JP | 6-2861 U | 1/1994 | |
| JP | 7-95360 A | 4/1995 | |
| JP | 9-15730 A | 1/1997 | |
| JP | 9-247361 A | 9/1997 | |
| JP | 2001-223862 A | 8/2001 | |
| JP | 2002-232648 A | 8/2002 | |
| JP | 2004-7542 A | 1/2004 | |

* cited by examiner

Primary Examiner — Cheukfan Lee
(74) Attorney, Agent, or Firm — Leydig, Voit & Mayer, Ltd.

(57) ABSTRACT

An image reading apparatus includes an illuminating optical system having light sources arranged in a line and a light guide member guiding rays of light from the light sources to illuminate a document which passes through a document reading position near a light emergent surface of the light guide member. An image reading optical system includes a rod lens array to read light passing through the document, and a cylindrical lens array in the light emergent surface of the light guide member. Ridge lines running along a subscanning direction on the light guide member are aligned in a scanning direction.

20 Claims, 15 Drawing Sheets (a)

(b)

(a)

(b)

IMAGE READING APPARATUS

FIELD OF THE INVENTION

The present invention relates to an image reading apparatus. More particularly, it relates to an illuminating optical system.

BACKGROUND OF THE INVENTION

Conventionally, as an illuminating apparatus for use in image reading apparatuses and so on, a linear illuminating apparatus has been implemented by using, as a light guide member, a transparent bar having a light emitting surface which is a convex curved one, by disposing an optical diffusion region in a flat surface which is opposite to the above-mentioned curved surface, and by further placing LED elements in both end portions of the transparent bar (for example, refer to patent reference 1).

Light emitted from the illuminating apparatus having this structure can illuminate the inside of a predetermined region with uniform intensity of illumination.

Patent reference 1: JP, 2002-232648, A

DISCLOSURE OF THE INVENTION

Problem to be Solved by the Invention

A problem with the conventional illuminating apparatus disclosed by above-mentioned patent reference 1 is, however, that because LED elements are disposed in the both end portions of the transparent bar, the number of LED elements which can be disposed is limited and it is therefore difficult to raise the intensity of illuminance.

The present invention is made in order to solve this problem, and it is therefore an object of the present invention to provide an image reading apparatus which has a large number of light sources which are arranged therein so that the intensity of illuminance is increased, and which is easy to adjust its illuminance level.

Means for Solving the Problem

In accordance with the present invention, there is provided an image reading apparatus including: an illuminating optical system having a plurality of light sources arranged in a line along a scanning direction of a document, and a light guide member for causing rays of light from the above-mentioned plurality of light sources to pass therethrough; a document conveying control system for conveying the above-mentioned document in a subscanning direction perpendicular to the above-mentioned scanning direction, and for causing the above-mentioned document to pass through a document reading position which is set up near a light emergence surface of the above-mentioned light guide member from which the rays of light from the above-mentioned plurality of light sources are emitted; and an image reading optical system comprised of a plurality of image formation optical systems and a plurality of light receiving elements which are aligned in the above-mentioned scanning direction, for reading light passing through the document at the above-mentioned document reading position, a cylindrical lens array having a plurality of ridge lines each running along the above-mentioned subscanning direction, the plurality of ridge lines being aligned in the above-mentioned scanning direction, being formed in the light emitting surface of the light guide member from which the rays of light from the above-mentioned plurality of light sources are emitted.

ADVANTAGES OF THE INVENTION

Therefore, in accordance with the present invention, there is provided an image reading apparatus which can increase the illuminance on a document's surface, which can observe the illumination distribution with a small amount of illuminance variations in the scanning direction even when there is no document, and which can facilitate the adjustment of the illuminance level.

PREFERRED EMBODIMENTS OF THE INVENTION

Embodiment 1

Figure 1:
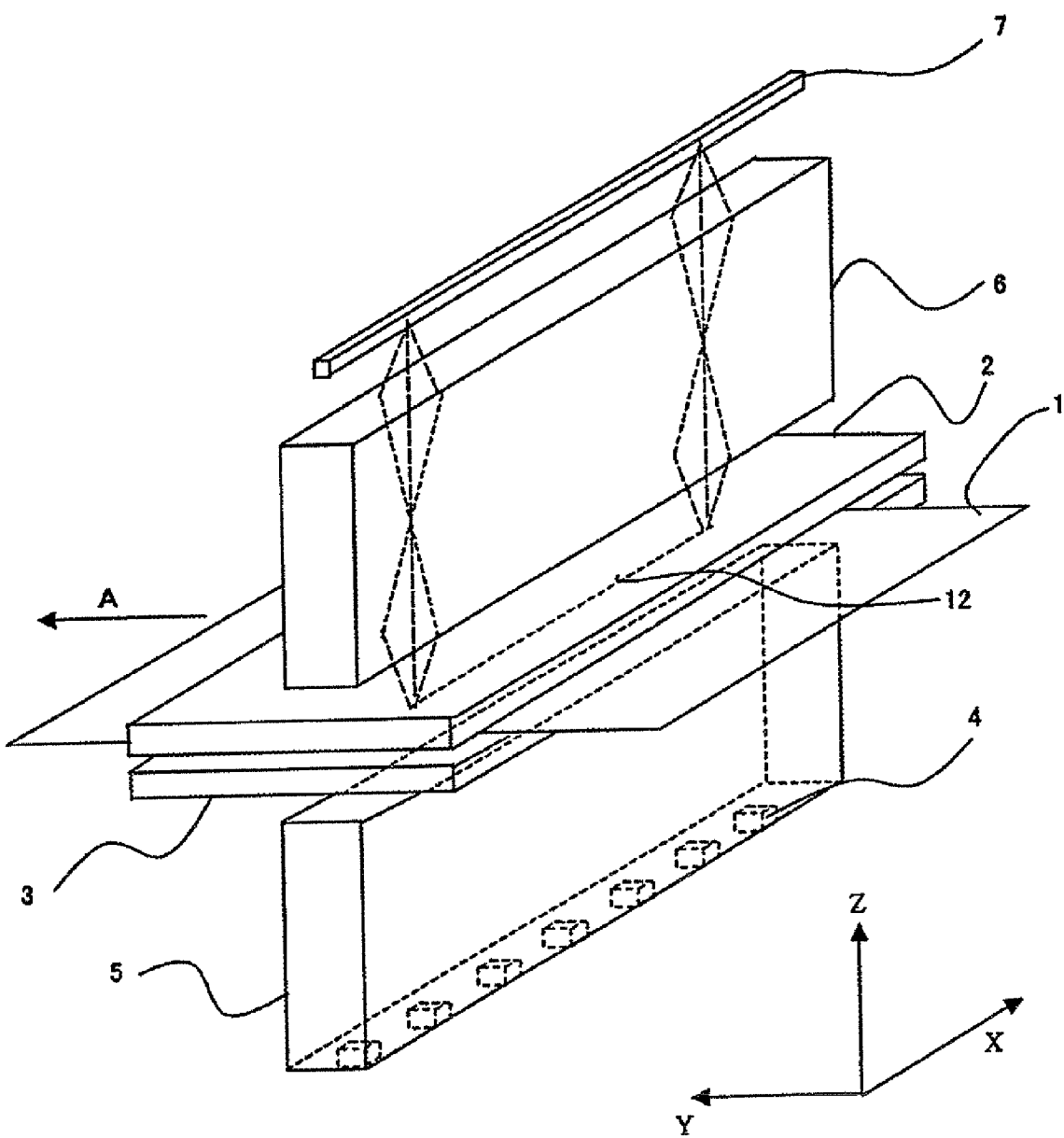
FIG. 1 is a perspective view of an image reading apparatus in accordance with Embodiment 1 of the present invention.
Figure 2:
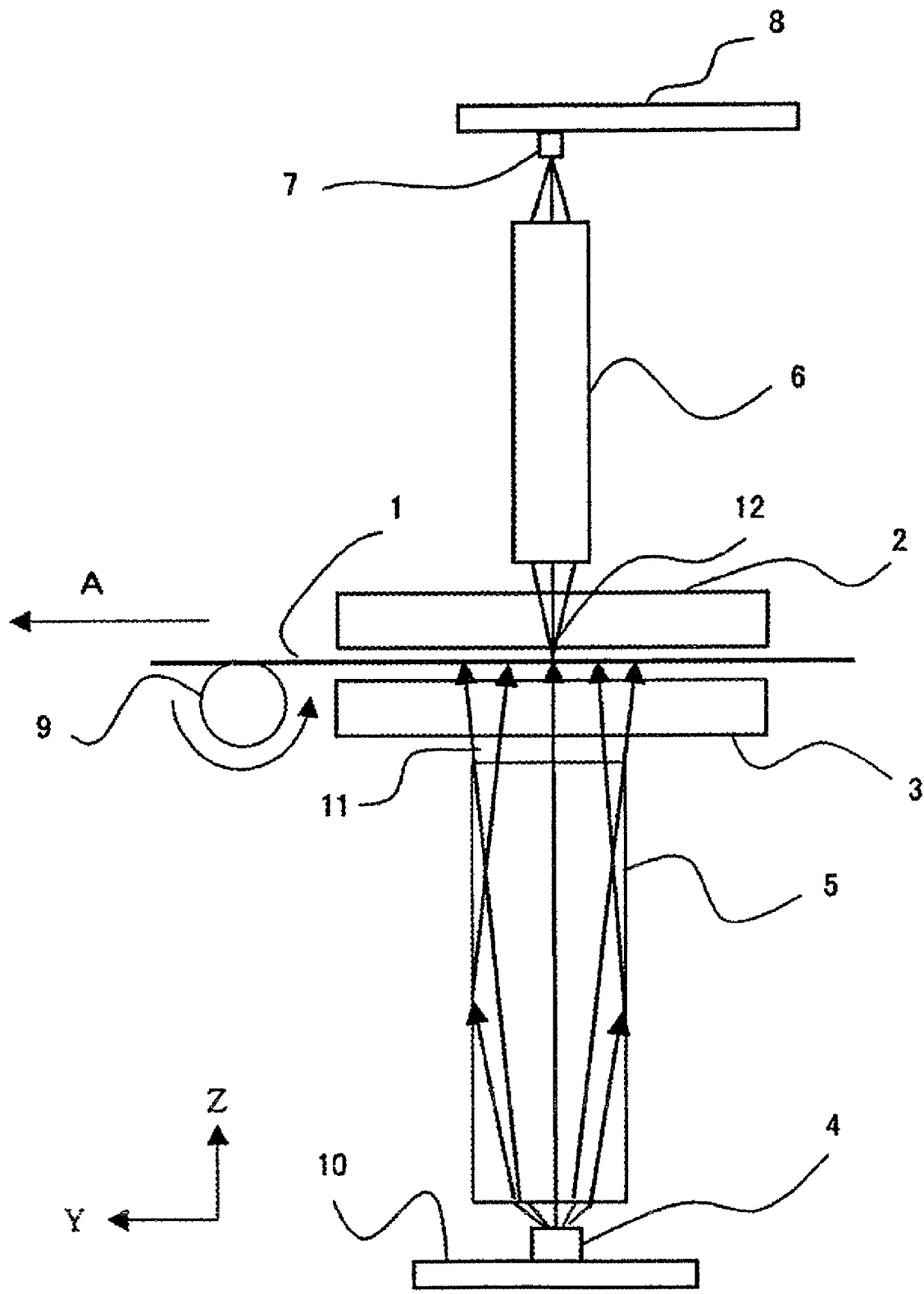
FIG. 2 is a cross-sectional structural diagram, taken along a subscanning direction, showing the image reading apparatus in accordance with Embodiment 1 of the present invention.
Figure 3:
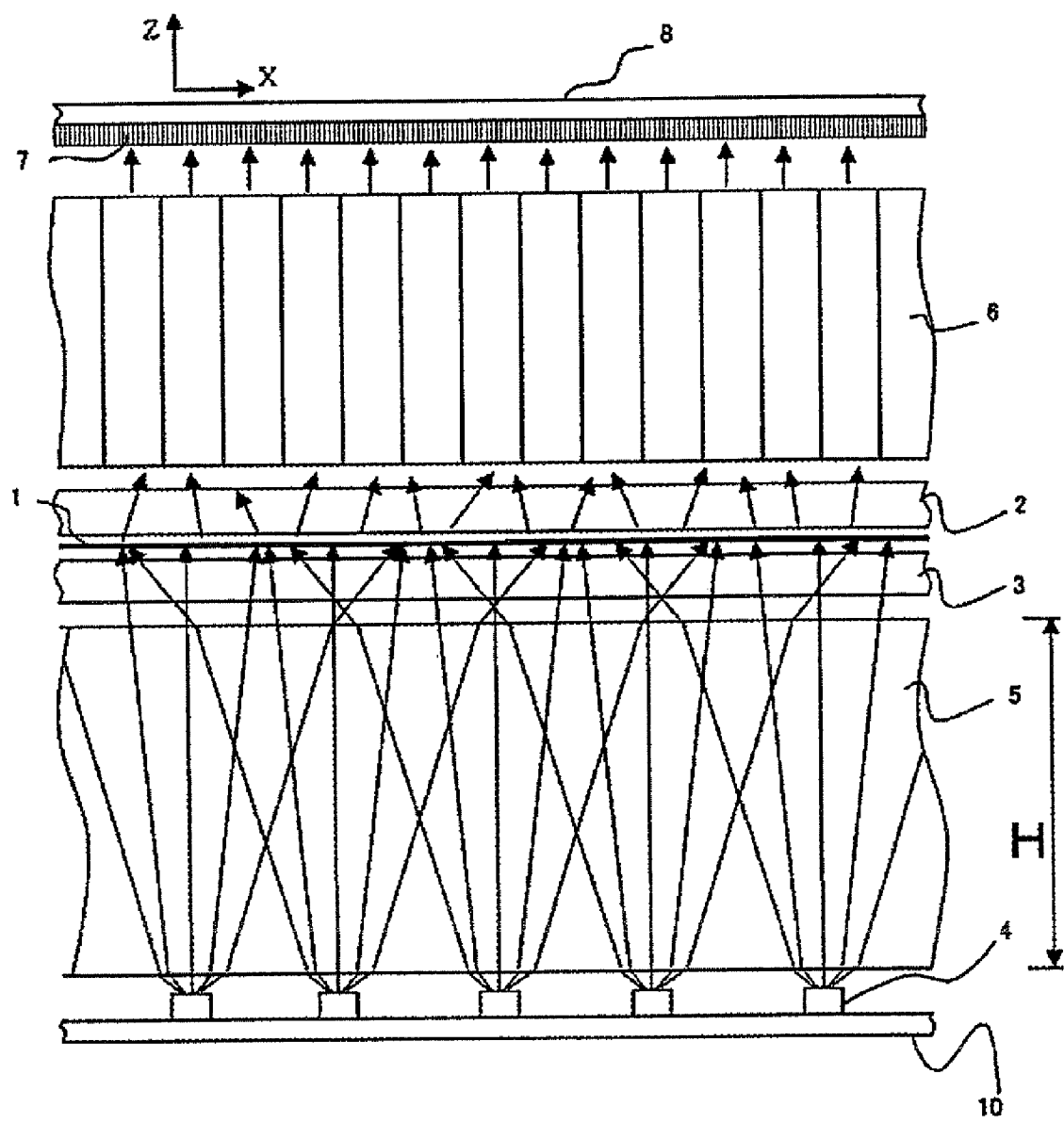
FIG. 3 is a cross-sectional structural diagram, taken along a scanning direction, showing a part of the image reading apparatus in accordance with Embodiment 1 of the present invention.

FIGS. 1 to 3 are diagrams showing an image reading apparatus in accordance with Embodiment 1 of the present invention, FIG. 1 is a perspective view of the image reading apparatus, FIG. 2 is a cross-sectional (YZ plane) structural diagram taken along a subscanning direction of the image reading apparatus, and FIG. 3 is a cross sectional (XZ plane) structural diagram showing a part of the image reading apparatus taken along a scanning direction of the image reading apparatus which is perpendicular to the subscanning direction. In the figures, an X-direction is the scanning direction, a Y-direction is the subscanning direction, and a Z-direction is an optical axis direction.

The image reading apparatus in accordance with this embodiment is comprised of an illuminating optical system, a document conveying control system for conveying a document 1 in the subscanning direction, and for holding the document 1 in such a manner that the document 1 always passes through a document reading position 12, and a reading optical system.

The document conveying control system consists of, for example, cover glasses 2 and 3 which sandwich the document 1 therebetween, and a platen 9. The document conveying control system causes the document 1 to move in a space which is sandwiched by the first cover glass 2 and the second cover glass 3 along a document conveying direction (i.e., along the subscanning direction) shown by an arrow A by driving the platen 9 and so on.

The illuminating optical system is comprised of a plurality of light sources 4, such as a plurality of LEDs, arranged in a line along the scanning direction, a substrate 10 on which the plurality of light sources 4 are placed, and a light guide member 5 whose major axis direction is the above-mentioned scanning direction, and whose minor axis direction is the above-mentioned subscanning direction, and rays of light 11 emitted from the plurality of light sources 4 are illuminated on one surface of the document 1 by way of the second cover glass 3 after passing through the light guide member 5.

The reading optical system is comprised of a plurality of image formation optical systems 6 arranged in the scanning direction (i.e., a rod lens array), and a sensor board 8 on which an IC 7 having a plurality of light receiving elements arranged in the scanning direction (i.e., a line sensor) is placed, and a reading position (i.e., an image reading line) 12 of the line sensor IC 7 is set to be running in the scanning direction. Light (light to be read) which is applied to the reading position 12 among rays of light which have passed through the document 1 is one-to-one normal-transferred onto the line sensor IC 7 by the rod lens array 6, and is then converted into an electric signal by this line sensor IC 7.

The above-mentioned illuminating optical system and the above-mentioned reading optical system are arranged in a region having a length in the above-mentioned scanning direction which is equal to or longer than the width of the document 1 (the width of the document in the scanning direction). The plurality of LEDs 4 are arranged at predetermined intervals in such a manner that the illuminance in the scanning direction on the document's surface becomes uniform.

When the document 1 is conveyed by, for example, the platen 9 and so on, the reading optical system reads an image (information) of the document 1 at the reading position 12 in succession, and all information on the whole of the document's surface is finally converted into an electric signal.

The above-mentioned reading position 12 is set up to be in the vicinity of the light emitting surface of the light guide member from which the rays of light from the light sources are emitted, and the document 1 is sandwiched by the first cover glass 2 and the second cover glass 3 in such a manner that the document 1 is controlled so as to pass through the above-mentioned reading position 12.

Because the image reading apparatus has such a structure as mentioned above, a large number of LEDs 4 can be arranged side by side so that the pitch of the LEDs 4 is reduced to its minimum when mounted and therefore the lighting illuminance can be increased.

Figure 4:
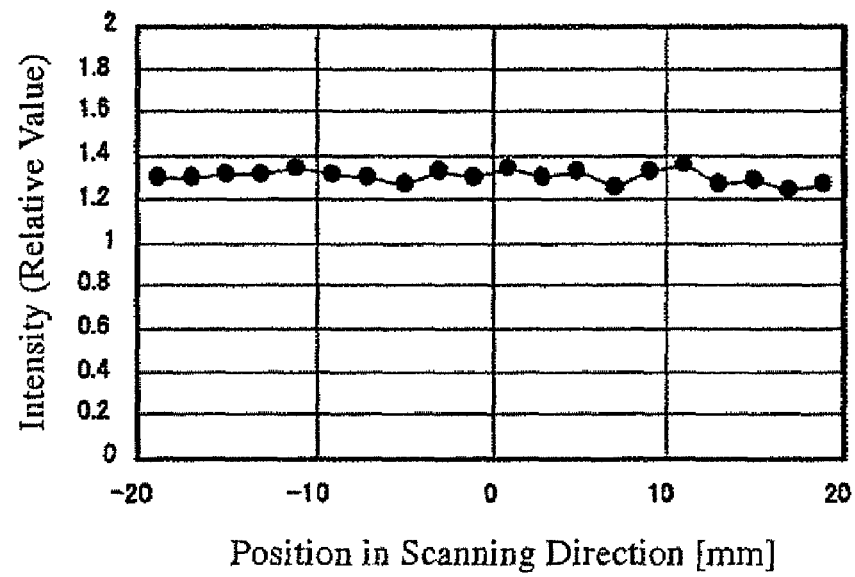
FIG. 4 is a diagram showing an illumination distribution in the scanning direction in a case in which a light emitting surface of a light guide member is flat.
Figure 4:
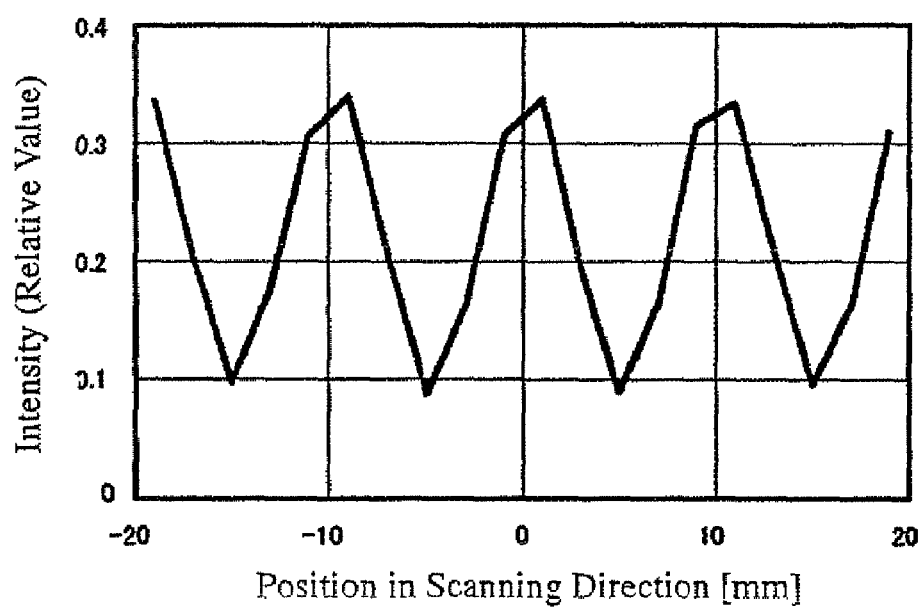

FIG. 4(a) is a diagram showing an illumination distribution in the scanning direction on the document's surface in the image reading apparatus having the above-mentioned structure. A good illumination distribution whose variations in the intensity of illuminance in the scanning direction are equal to or less than 10% is acquired.

However, there can be a case in which when, for example, making an adjustment to the illuminance level, the image reading apparatus detect the intensity of illuminance in a state in which there is no document in the image reading apparatus. At that time, when the detected intensity of illuminance changes greatly, the image reading apparatus cannot make an accurate adjustment to the illuminance level. FIG. 4(b) is a graph showing results of calculation of the intensity of illuminance in the scanning direction which can be observed by the reading optical system when there is no document in the image reading apparatus. The amount of variations in the intensity of illuminance in this case reaches about 60%, and therefore there is a problem that it is difficult to use the intensity of illuminance as reference intensity of illuminance for adjustment of the illuminance level.

There are reasons for above-mentioned variations in the intensity of illuminance. That is, because when there is a document in the image reading apparatus, the rays of light from the light sources 4 are scattered by the document 1, rays of light passing through the document reading position 12 have a uniform angular distribution along the scanning direction, whereas when there is no document in the image reading apparatus, rays of light passing through the document reading position 12 have different angular distributions just above each light source 4 and just above a point between adjacent light sources 4. Because the rod lens array 6 of the reading optical system has a limited angle of aperture, if the rays of light passing through the document reading position have different angular distributions in the scanning direction, the amount of rays of light which can pass through the above-mentioned rod lens array 6 varies dependently upon a position in the scanning direction through which they pass. As a result, the intensity of illuminance which is detected in the scanning direction changes greatly.

Figure 5:
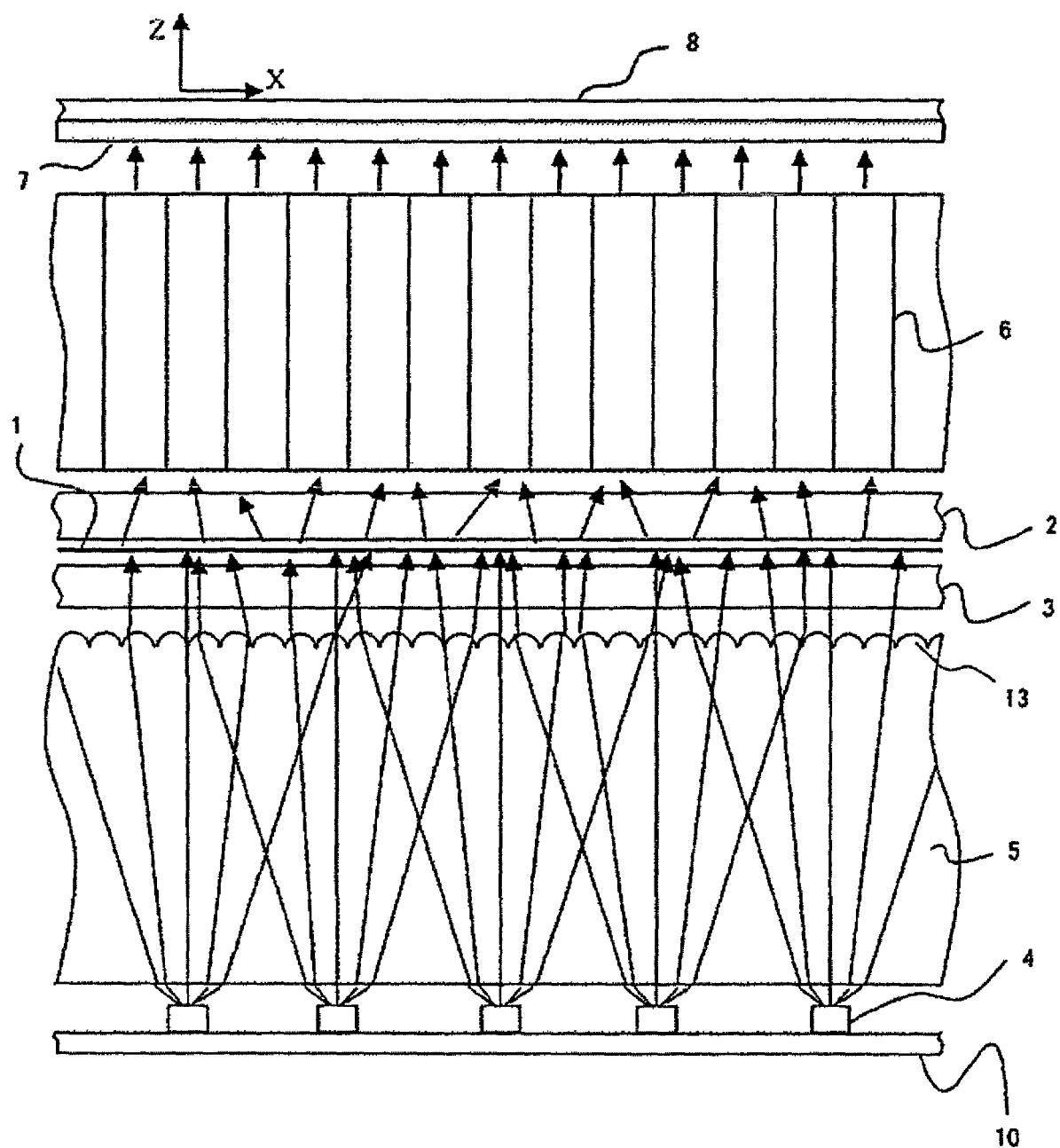
FIG. 5 is a cross-sectional structural diagram, taken along the scanning direction, showing a part of the image reading apparatus in accordance with Embodiment 1 of the present invention.

As a means of solving the above-mentioned problem, in accordance with this embodiment, a cylindrical lens array 13 having a plurality of ridge lines running in parallel along the subscanning direction is formed in the light emitting surface of the light guide member 5, as shown in FIG. 5. Because the cylindrical lens array 13 is constructed in this way, the cylindrical lens array 13 acts on the flux of light emitted from the plurality of light sources (LEDs) 4 to control the directional distribution of the flux of light passing through the document reading position with respect to the scanning direction, thereby uniformly producing rays of light having an angle falling within the angle of visibility of the reading optical system over the light emitting surface, and therefore making the intensity of illuminance in the scanning direction become uniform also when there is no document in the image reading apparatus.

Figure 6:
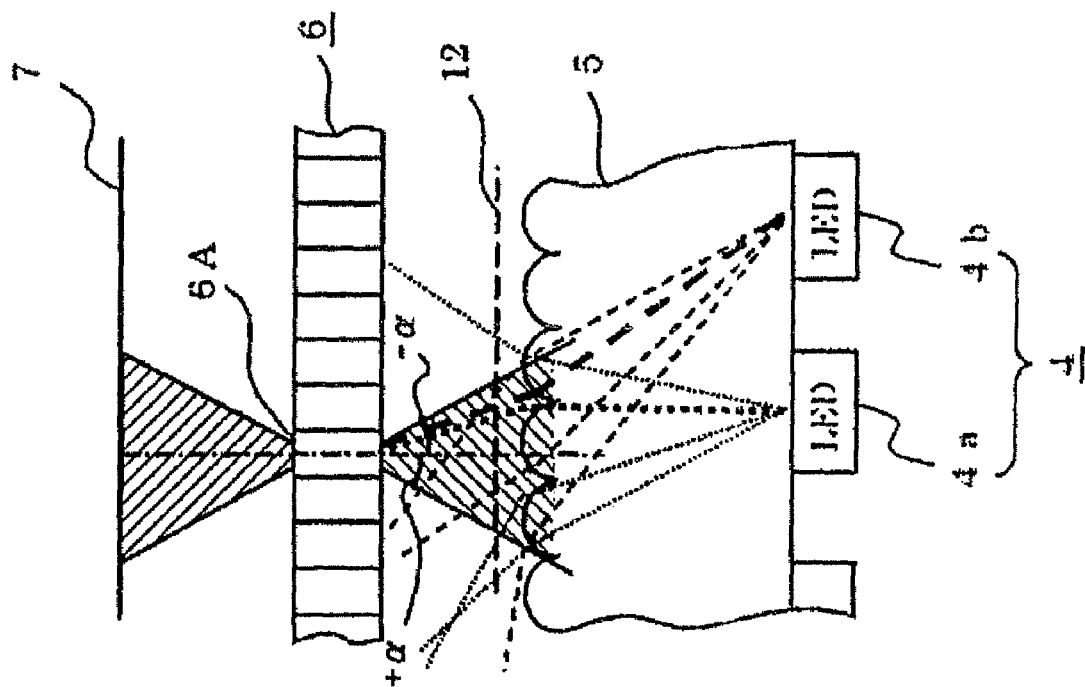
FIG. 6 is a diagram explaining an action of a cylindrical lens array in accordance with Embodiment 1 of the present invention.
Figure 6:
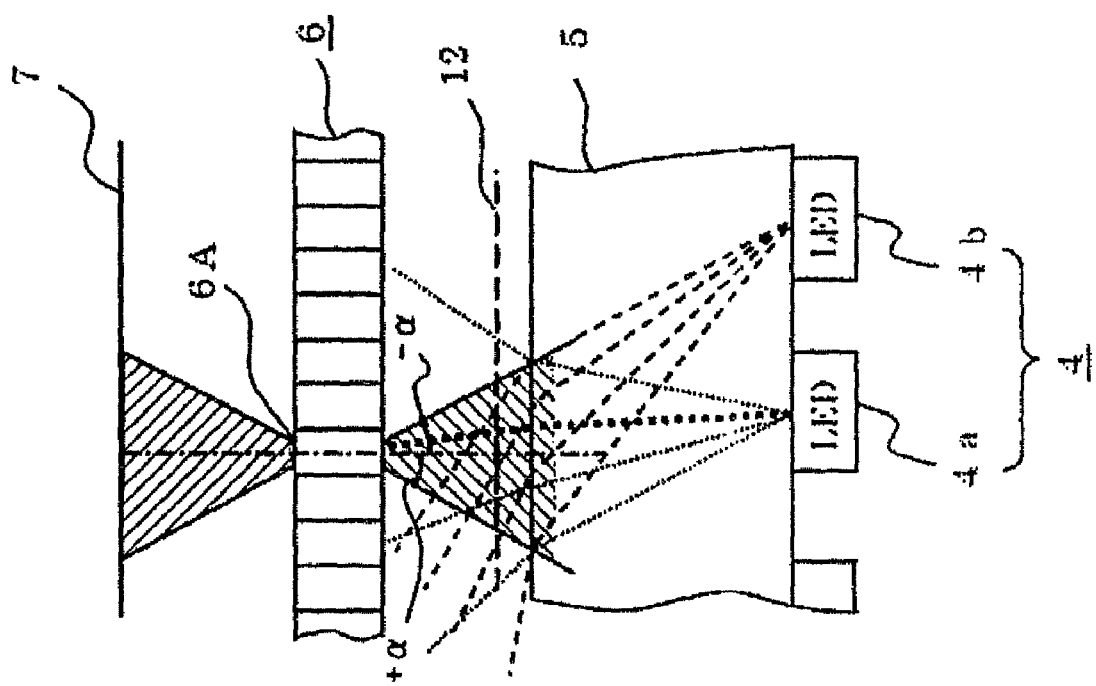

Hereafter, the action of the above-mentioned cylindrical lens array 13 in the image reading apparatus of this embodiment will be explained with reference to FIG. 6. FIG. 6(a) shows the flux of light from the light sources 4 in a case in which the light emitting surface of the light guide member 5 is flat (conventional structure), and FIG. 6(b) shows the flux of light from the light sources 4 in the case in which the cylindrical lens array 13 is formed in the light emitting surface of the light guide member 5 (present invention). Hereafter, an explanation will be made by focusing attention to one rod lens array 6A located just above a light source 4a among the rod lens array 6 which constructs the reading optical system.

Hereafter, assume a case in which the angle of visibility of the rod lens array 6A is ±α, and there is no document at the reading position 12. While when rays of light emitted from an LED 4 fall within the angle of visibility of the rod lens array 6A, the above-mentioned rays of light are guided to the sensor 7 according to the positional relationship between the rod lens array 6A and the LED 4, when the rays of light emitted from the LED 4 do not fall within the angle of visibility of the rod lens array 6A, they cannot be guided to the sensor 7.

For example, as shown in FIG. 6(a), when the light emitting surface of the light guide member 5 is flat, while a part of rays of light emitted from the LED 4a located nearly just under the rod lens array 6A is guided to the sensor 7, rays of light emitted from another LED 4b adjacent to the LED 4a are not guided to the sensor's surface. The number of rays of light falling within the angle of visibility of a rod lens array located just above a point between adjacent light sources 4 is smaller than the number of rays of light falling within the angle of visibility of a rod lens array located just above a light source 4. Therefore, an intensity distribution depending on the disposing pitch of the LEDs 4 occurs on the sensor surface, and this results in occurrence of a distribution in the intensity of illuminance which is observed when there is no document in the image reading apparatus.

In contrast, in the case in which the cylindrical lens array 13 is formed in the light emitting surface of the light guide member 5, as shown in FIG. 6(b), while the rays of light emitted from the LED 4a are diffused by the cylindrical lens array 13 and rays of light guided to the sensor 7 decreases from those in the case of FIG. 6(a), the rays of light emitted from the LED 4b are also diffused by the cylindrical lens array 13 and a part of them is guided to the sensor 7. The number of rays of light falling within the angle of visibility of any rod lens array located just above a point between adjacent light sources 4 can be made to be the same as the number of rays of light falling within the angle of visibility of a rod lens array located just above a light source 4. As a result, the distribution of light rays on the sensor is smoothed, and even when there is no document in the image reading apparatus, a uniform illumination distribution can be observed.

Figure 7:
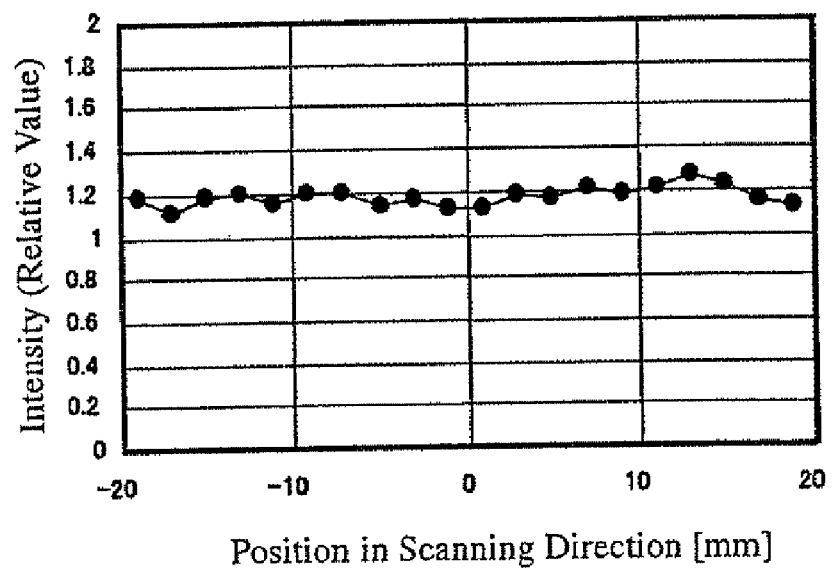
FIG. 7 is a diagram showing an illumination distribution in the scanning direction of the image reading apparatus in accordance with Embodiment 1 of the present invention.
Figure 7:
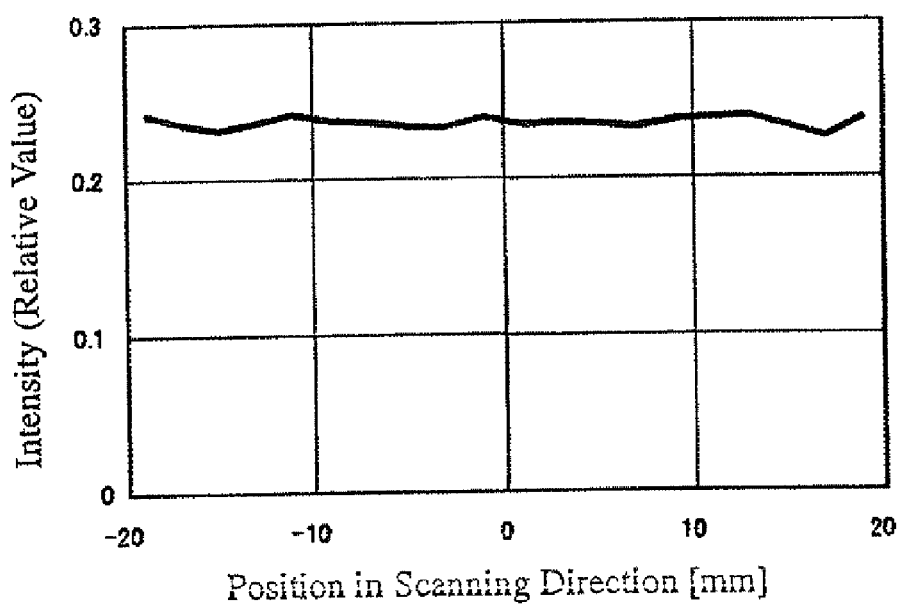

An illumination distribution in the case in which the above-mentioned cylindrical lens array 13 is formed in the light emitting surface of the light guide member 5 is shown in FIG. 7. FIG. 7(a) shows an illumination distribution on a document 1s surface when the document is placed in the image reading apparatus, and FIG. 7(b) shows an illumination distribution which is observed by the reading optical system when there is no document in the image reading apparatus.

When there is a document in the image reading apparatus, a good illumination distribution with 10% or less of variations is acquired in the scanning direction, as in the case in which the light emitting surface of the light guide member 5 is flat. Furthermore, even when there is no document in the image reading apparatus, a good illumination distribution with 5% or less of variations which is detected in the scanning direction is acquired.

Thus, because the cylindrical lens array 13 having a plurality of ridge lines each running along the subscanning direction, the plurality of ridge lines being aligned in the scanning direction, are formed in the light emitting surface of the light guide member 5, the image reading apparatus can observe an illumination distribution with a small amount of illuminance variations in the scanning direction even when there is no document 1 in the image reading apparatus.

It is desirable that, in order to make uniform the angular distribution of rays of light passing through the document reading position when there is no document in the image reading apparatus, each cylindrical lens which constructs the cylindrical lens array 13 is formed in such a manner as to be in close contact with any adjacent cylindrical lens in a side surface parallel to the direction of the cylindrical axis thereof, and the cylindrical lens array 13 forms a so-called lenticular lens.

The lenticular lens can be directly molded onto the light emitting surface of the light guide member 5 by using injection molding, or a lenticular lens film formed with printing can be arranged in such a manner as to be in close contact with the light emitting surface of the light guide member 5 or can be bonded to the light emitting surface.

In the above-mentioned embodiment, although the convex cylindrical lens array is shown, a concave cylindrical lens array can be formed instead of the convex cylindrical lens array, and the same advantage can be provided.

Furthermore, in the above-mentioned embodiment, an illuminance distribution with 10% or less of variations in the scanning direction in a case in which there is a document in the image reading apparatus is shown in FIG. 7(a). In order to, in a case in which there is a document in the image reading apparatus, provide a good illumination distribution on the document's surface, it is preferable to set H/L to a predetermined value, where the pitch of the light sources (the LEDs) 4 in the direction (the scanning direction) in which the light sources are aligned is expressed as L and the height in the optical axis direction of the light guide member 5 is expressed as H.

Figure 8:
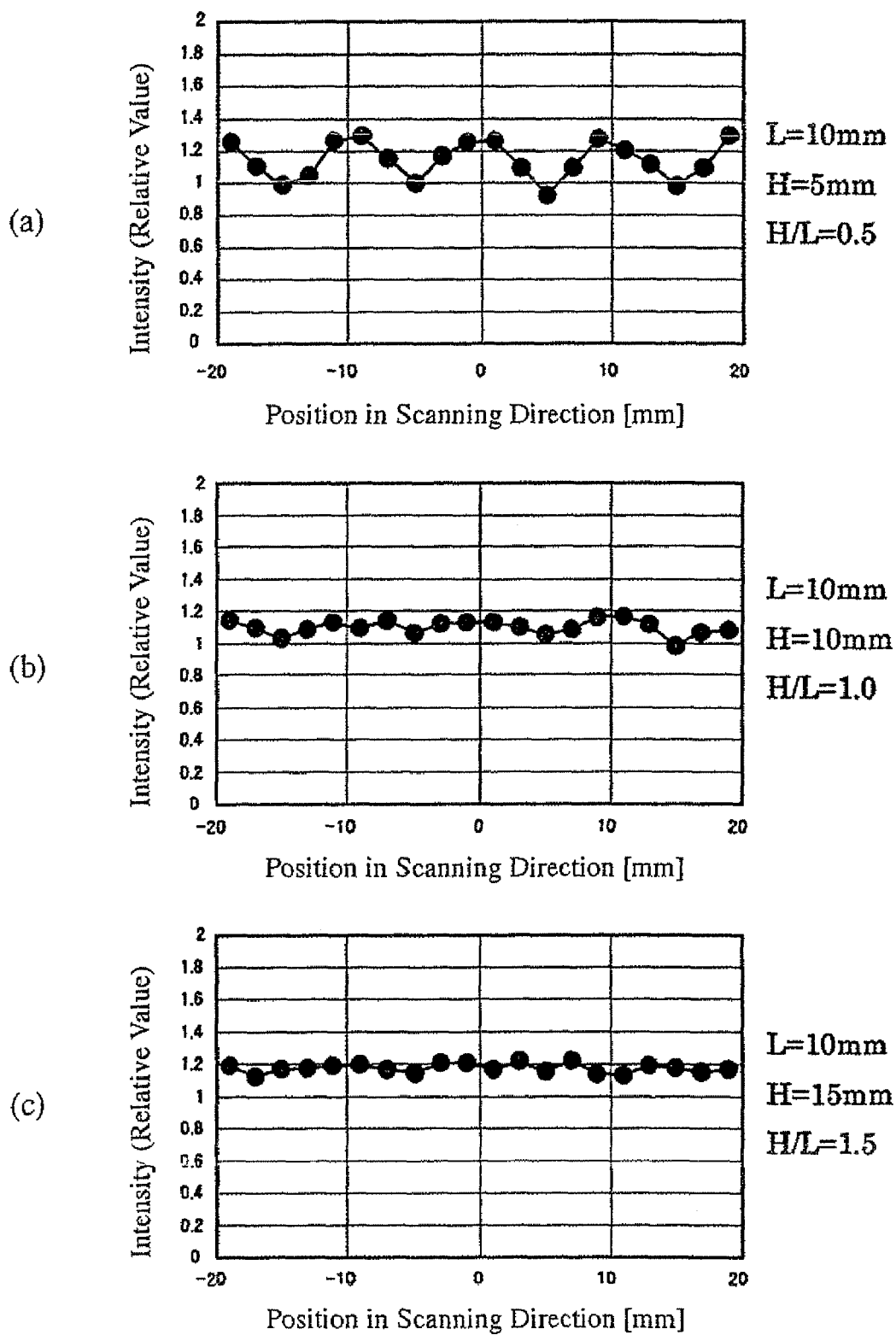
FIG. 8 is a diagram showing calculation results of the illumination distribution in a case in which the height H of the light guide member in accordance with Embodiment 1 of the present invention is changed.

Hereafter, a relation between H and L will be shown in detail. FIG. 8 is a diagram showing an illumination distribution when L is kept constant and H is changed, and shows an illumination distribution in the scanning direction on the document's surface which is determined through ray trace calculation, FIG. 8(a) shows an illumination distribution when L=10 mm and H=5 mm, FIG. 8(b) shows an illumination distribution when L=10 mm and H=10 mm, and FIG. 8(c) shows an illumination distribution when L=10 mm and H=15 mm. It is clear from these figures that as the height H of the light guide member 5 increases, the illumination distribution in the scanning direction becomes more uniform. The deviation (MAX−MIN)/(MAX+MIN) of the illumination distribution in the case of H/L=1/2 of FIG. 8(a) is about 20%, the deviation of the illumination distribution in the case of H/L=1 of FIG. 8(b) is 10%, and the deviation of the illumination distribution in the case of H/L—1.5 of FIG. 8(c) is 10% or less. It is preferable that when there is a document in the image reading apparatus, the deviation of the illumination distribution in the scanning direction is reduced to 20% or less, and it is desirable that the deviation of the illumination distribution in the scanning direction is reduced to 10% or less. Therefore, by making the height H of the light guide member satisfy H/L>−1/2, and by desirably making the height satisfy H/L>1, when there is a document in the image reading apparatus, the image reading apparatus can provide a good illumination distribution on the document's surface, and can read the document with a high degree of accuracy. Also when changing L, the same calculation results are obtained about the relation between the height H of the light guide member 5 and the illumination distribution in the scanning direction.

As can be seen from the above-mentioned results, by forming the cylindrical lens array 13 in the light emitting surface of the light guide member 5, and by making the height H of the light guide member satisfy H/L>=1/2, and by desirably making the height satisfy H/L>=1, when there is a document in the image reading apparatus and also when there is no document in the image reading apparatus, the image reading apparatus can make the illumination distribution in the scanning direction become uniform.

Embodiment 2

Figure 9:
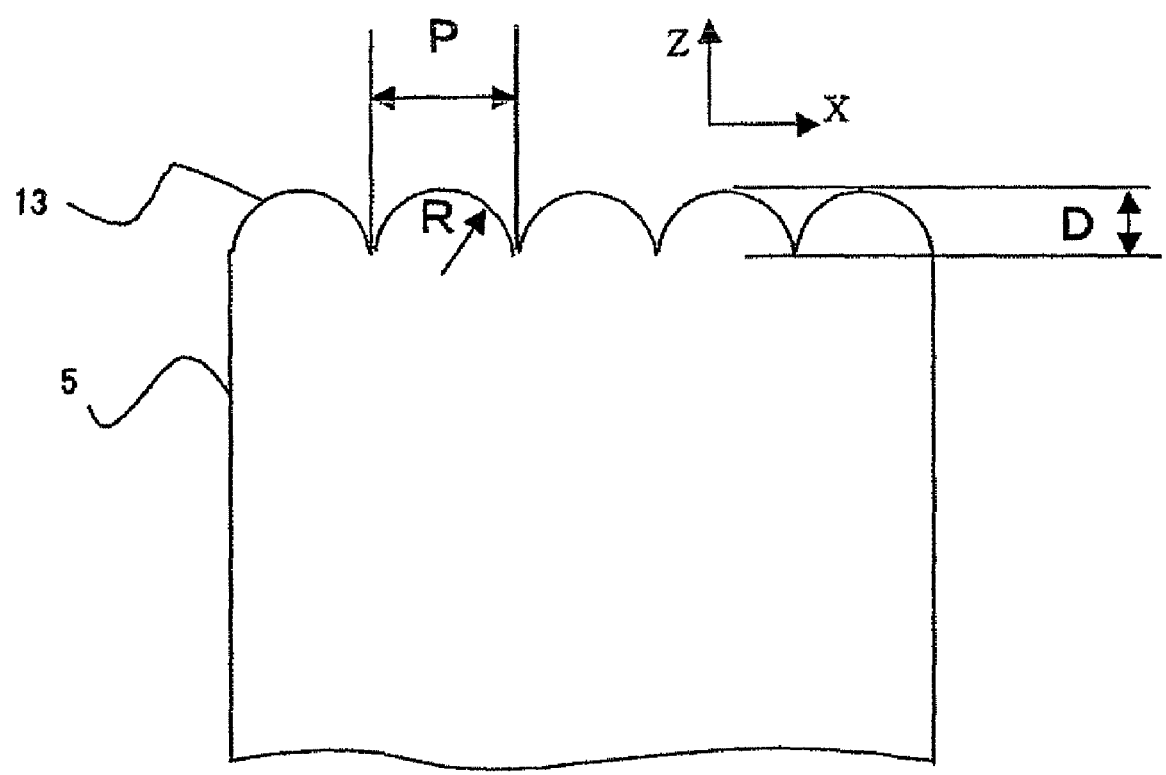
FIG. 9 is a cross-sectional structural diagram, taken along a scanning direction, showing a part of a light guide member in accordance with Embodiment 2 of the present invention.

FIG. 9 is a cross-sectional (XZ surface) structural diagram, taken along a scanning direction, showing a part of a light guide member in accordance with Embodiment 2 of the present invention, and is a diagram showing the details of a cylindrical lens array 13 formed in the light emitting surface of the light guide member 5.

The cylindrical lens array 13 is formed in the light emitting surface of the light guide member 5, and the curvature of each cylindrical lens is expressed as R, the pitch (pitch) of the cylindrical lenses is expressed as P, and the thickness of each cylindrical lens in its optical axis direction is expressed as D.

Figure 10:
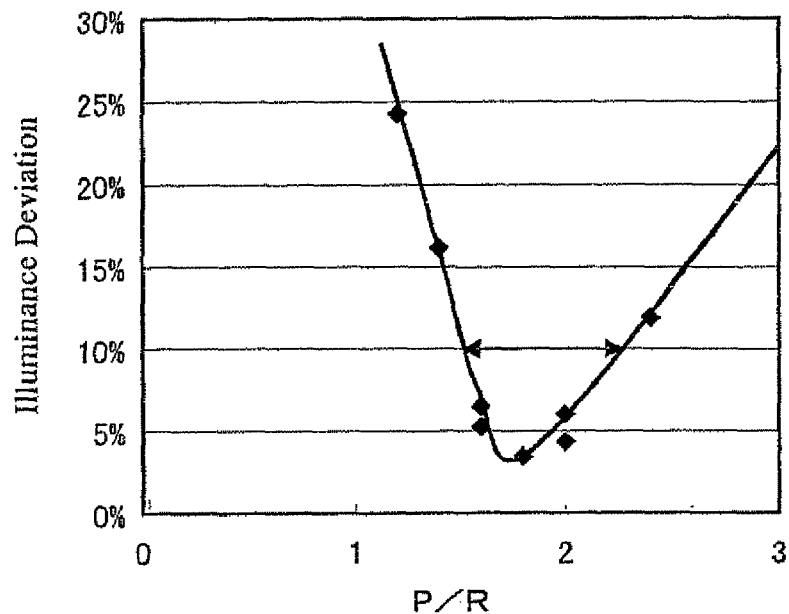
FIG. 10 is a diagram showing a relation between the size of a cylindrical lens array in accordance with Embodiment 2 of the present invention and a deviation of an illumination distribution.

FIG. 10 shows results of calculation of a relation between the ratio P/R of the pitch (pitch) P of the cylindrical lenses to the curvature R of each cylindrical lens and a deviation of an illumination distribution in the scanning direction which is detected when there is no document in the image reading apparatus. In this case, the thickness D of each cylindrical lens and the radius of curvature R of each cylindrical lens are selected in such a manner that each cylindrical lens is in close contact with any adjacent cylindrical lens in a side surface parallel to the direction of the cylindrical axis thereof.

It is clear from FIG. 10 that a region with 10% or less of illuminance deviation corresponds to a range of P/R from 1.6 to about 2.3, and a region with 20% or less of illuminance deviation corresponds to a range of P/R from 1.3 to 2.85. FIG. 10 shows results in the case of P<=0.75 mm.

Figure 11:
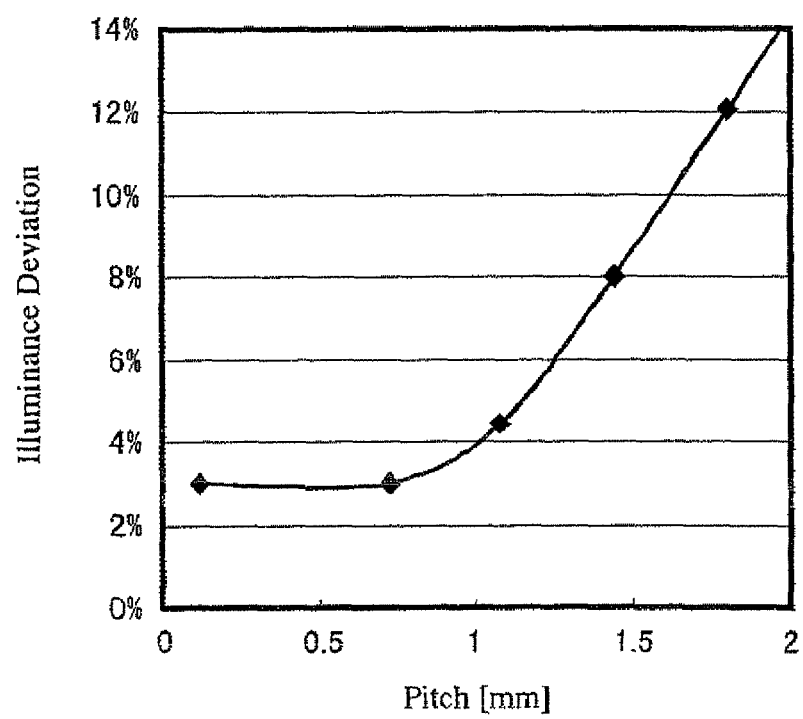
FIG. 11 is a diagram showing a relation between the size of the cylindrical lens array in accordance with Embodiment 2 of the present invention and a deviation of an illumination distribution.

When the pitch (pitch) P of the cylindrical lenses becomes larger than 0.75 mm, the illuminance deviation becomes larger than that shown in FIG. 10. Results of calculation of the relation between the deviation of the illumination distribution in the scanning direction which is detected when there is no document in the image reading apparatus, and P is shown in FIG. 11. In FIG. 11, the illuminance deviation is 13% in the case of P=1.9 mm, and 10% of difference with the illuminance deviation of 3% in the case of P<=0.75 mm is added to the curve of FIG. 10. Therefore, when the pitch P of the cylindrical lenses is 1.9 mm or less, if P/R is so set as to range from 1.6 to 2.3, the total illuminance deviation can be reduced to 20% or less.

FIGS. 10 and 11 show results in the case of H/L>=1.

As can be seen from the above-mentioned results, by setting P/R to range from 1.3 to 2.85, and by desirably setting P/R to range from 1.6 to 2.3 when the pitch P of the cylindrical lenses is 0.75 mm or less, or by setting P/R to have a range with a smaller illuminance deviation when the pitch P of the cylindrical lenses is larger than 0.75 mm, the illuminance deviation can be reduced to a predetermined amount or less, and, even when there is no document in the image reading apparatus, an illumination distribution in the scanning direction with a small amount of illuminance variations can be observed.

Embodiment 3

Figure 12:
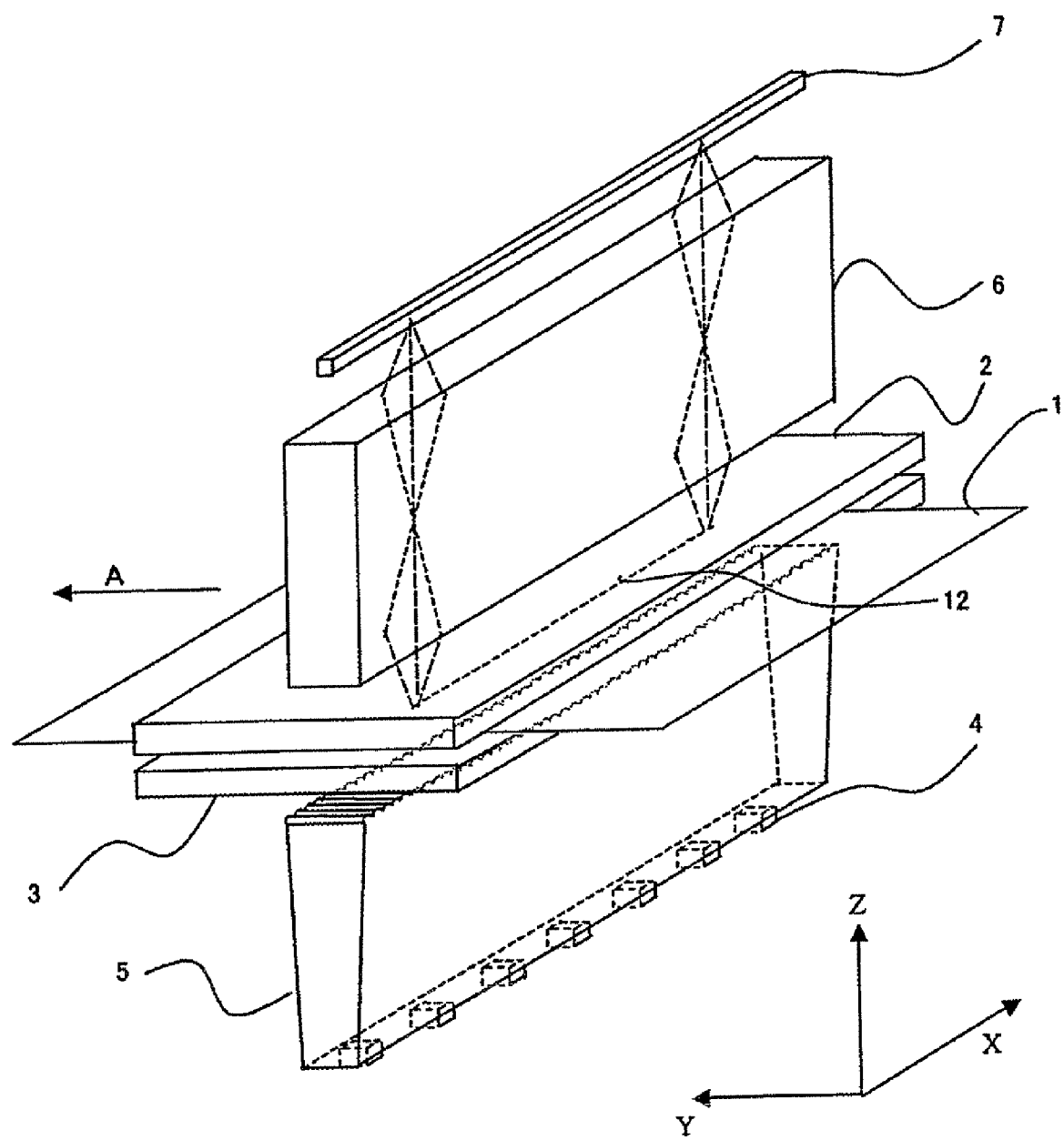
FIG. 12 is a perspective view of an image reading apparatus in accordance with Embodiment 3 of the present invention.
Figure 13:
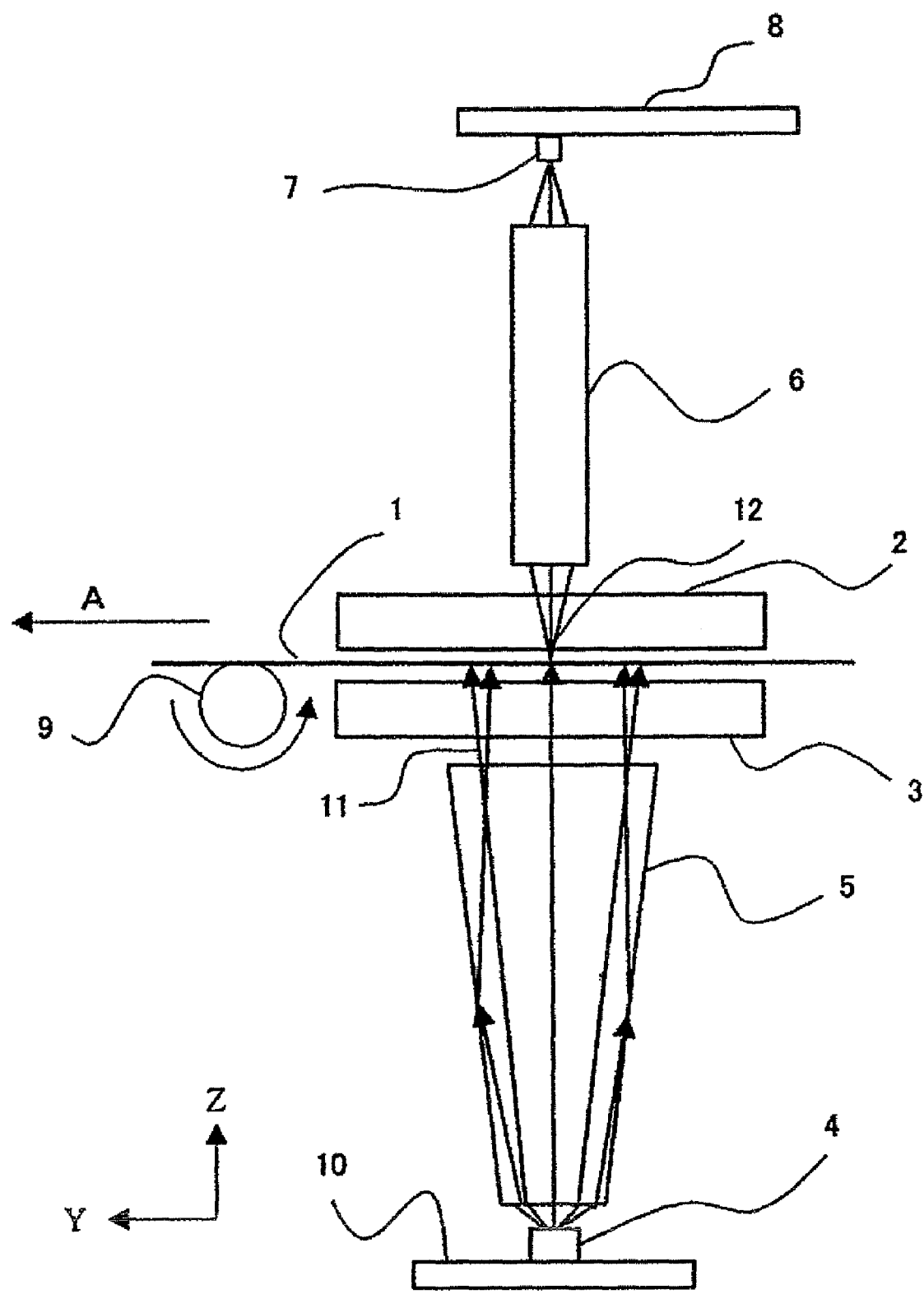
FIG. 13 is a cross-sectional structural diagram, taken along a subscanning direction, showing the image reading apparatus in accordance with Embodiment 3 of the present invention.

FIG. 12 is a perspective view of an image reading apparatus in accordance with Embodiment 3 of the present invention, and FIG. 13 is a cross-sectional structural diagram, taken along a subscanning direction, showing the image reading apparatus in accordance with Embodiment 3 of the present invention. When the gap between the first cover glass 2 and the second cover glass 3 is narrow, the document 1 cannot be passed through between the first cover glass 2 and the second cover glass 3 because of creases and curling in the document. Therefore, it is necessary to set the gap between the first cover glass 2 and the second cover glass 3 to have a width of about 1 to 2 mm. In order to read the light and shade of the document 1 correctly, the image reading apparatus has to apply a uniform intensity of illuminance in the direction of the optical axis (i.e., in the depth direction) between the first cover glass 2 and the second cover glass 3 which have such a gap.

Furthermore, the alignment between the optical axis of the illuminating optical system and the optical axis of the reading optical system depends upon the accuracy of the assembly of the apparatus, and, in a case in which a certain optical axis offset, e.g., an offset of about ±1 mm is permitted, the image reading apparatus has to apply a uniform intensity of illuminance to this range (about ±1 mm) in order to correctly read the light and shade of the document 1 in the subscanning direction.

More specifically, the image reading apparatus has to make uniform both the illuminance in the depth direction and that in the subscanning direction in a predetermined region which is close to the document reading position.

In accordance with this embodiment, as shown in FIGS. 12 and 13, the light guide member 5 is formed in such a manner as to have a narrow trapezoidal sectional shape in the subscanning direction on a side of the LEDs 4. With this structure, the image reading apparatus can apply a uniform intensity of illuminance to the predetermined region which is close to the document reading position, i.e., a predetermined region which is close to the light emitting surface of the illuminating optical system.

The cylindrical lens array 13 which is the same as that as shown in any one of Embodiments 1 and 2 is formed in the light emitting surface of the light guide member 5 of this embodiment.

Figure 14:
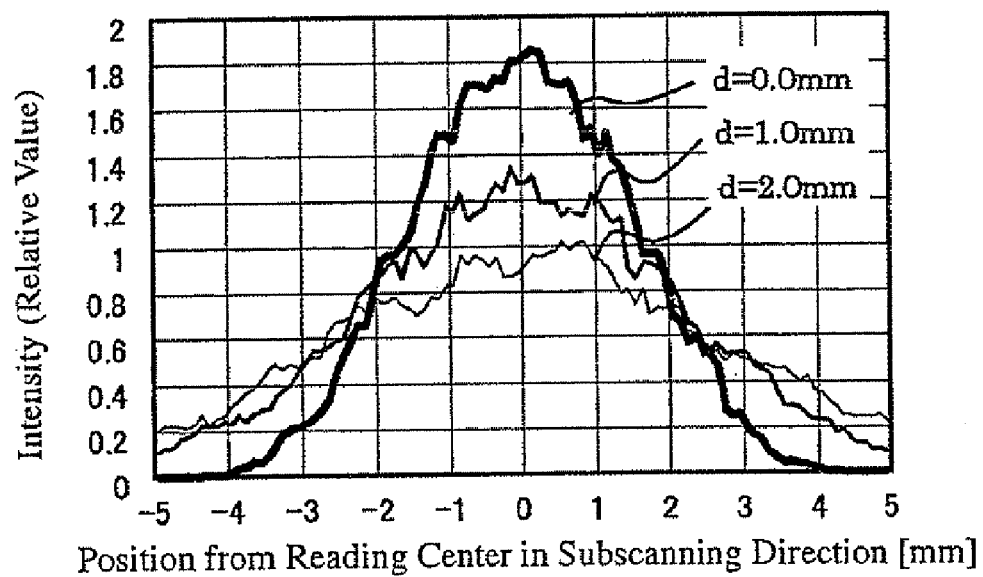
FIG. 14 is a diagram showing calculation results of an illumination distribution on a document's surface in a case in which a light guide member has a rectangular sectional shape in the subscanning direction.
Figure 15:
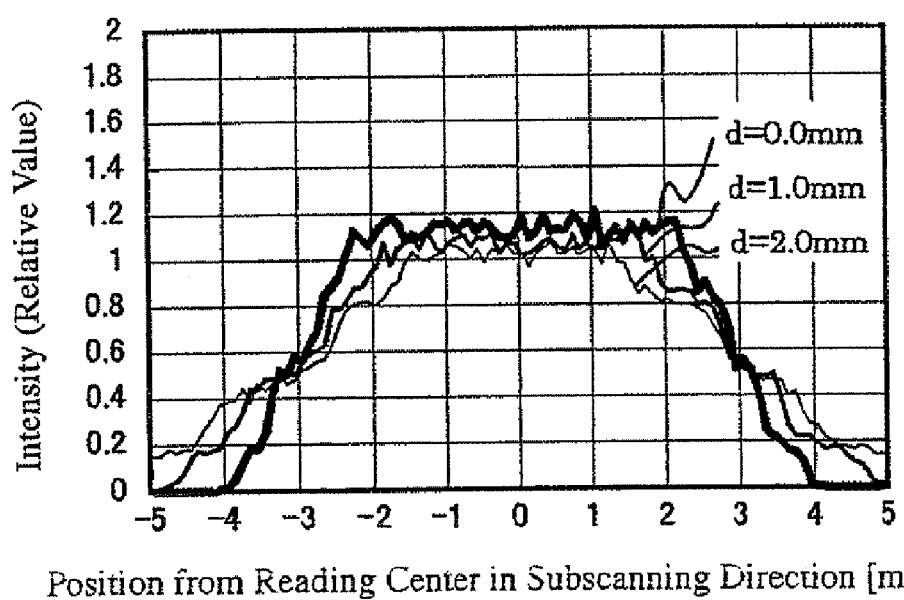
FIG. 15 is a diagram showing calculation results of an illumination distribution on a document surface of a light guide member in accordance with Embodiment 3 of the present invention.

FIG. 14 shows examples of results of calculation of an illumination distribution on a document's surface with ray tracing in a case in which the sectional shape in the subscanning direction of the light guide member 5 is rectangular, and FIG. 15 shows examples of results of calculation of an illumination distribution on a document's surface with ray tracing in the case in which the sectional shape in the subscanning direction of the light guide member is a narrow trapezoidal one on the side of the LEDs 4.

In FIGS. 14 and 15, the horizontal axis shows the distance from a reading center (which nearly matches with the optical axis) in the subscanning direction, the vertical axis shows the light intensity (a relative value), and d shows the distance from an upper surface of the second cover glass 3.

In the calculation examples of the illumination distribution of FIG. 14, with respect to the subscanning direction, the intensity of illuminance at the reading center is high and the intensity of illuminance decreases with distance from the reading center toward the both ends. The intensity of illuminance at the reading center changes greatly among the cases of d=2 mm, d=1 mm, and d=0 mm, and an illuminance difference of about ±40% occurs among them with reference to the intensity of illuminance in the case of d=1 mm. In contrast, in the calculation examples of the illumination distribution shown in FIG. 15, in any of the cases of d=0 mm, d=1 mm, and d=2 mm, a substantially uniform intensity of light is acquired in a region of ±1 mm or less from the center with respect to the subscanning direction, and an illuminance difference which occurs among them with reference to the intensity of illuminance in the case of d=1 mm is reduced to ±10% or less.

Because the light guide member 5 is thus formed in such a manner as to have a narrow trapezoidal sectional shape in the subscanning direction on the side of the LEDs 4, the image reading apparatus can make uniform both the illuminance in the depth direction and that in the subscanning direction in a desired region.

Figure 16:
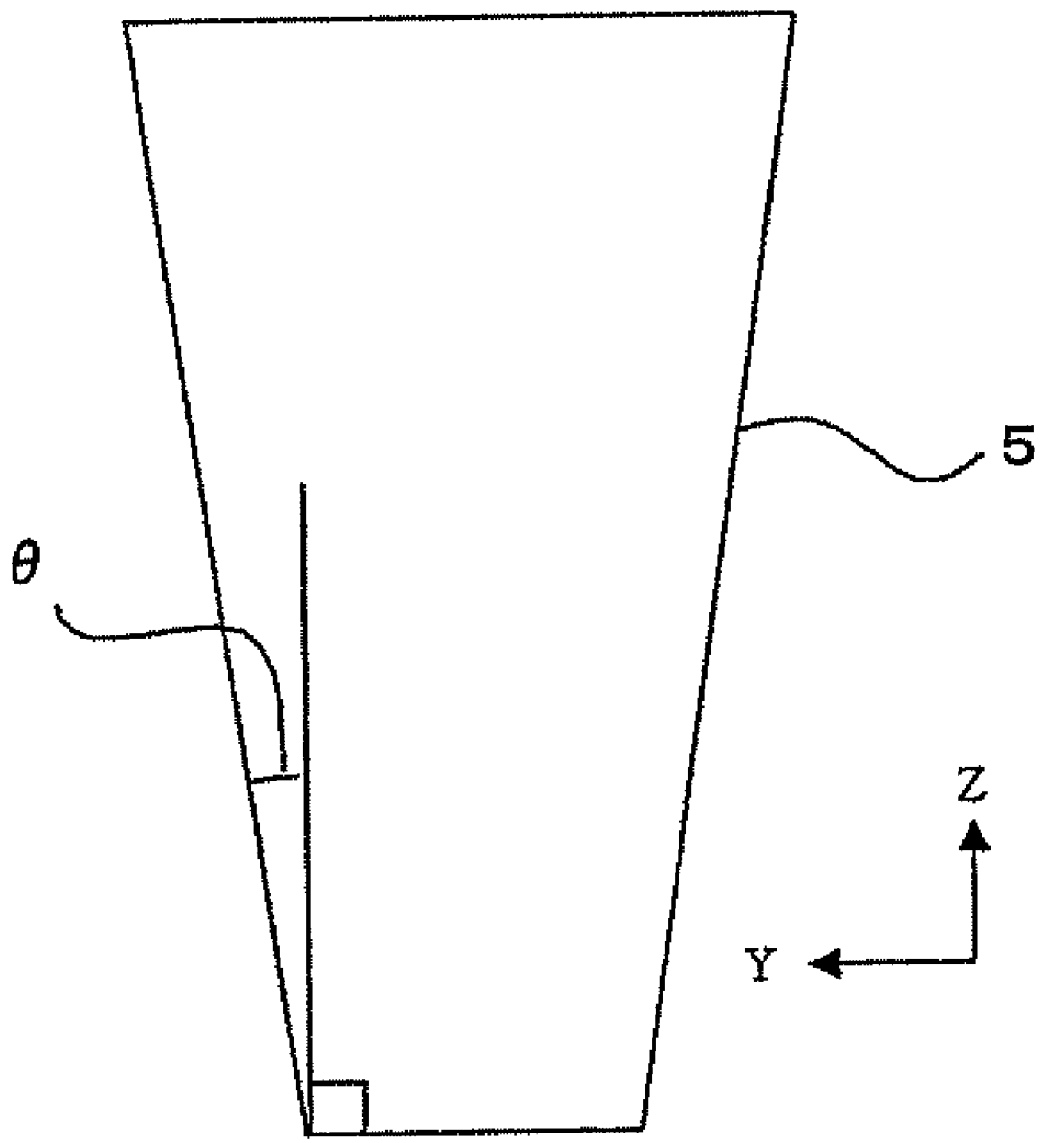
FIG. 16 is a cross-sectional structural diagram, taken along the subscanning direction, showing the light guide member in accordance with Embodiment 3 of the present invention.

FIG. 16 is a cross-sectional structural diagram showing the light guide member in accordance with Embodiment 3 of the present invention, the diagram being taken along a minor axis direction of the light guide member (i.e., the subscanning direction). The cylindrical lens array 13 is formed in the light emitting surface of the light guide member 5. An angle between a surface perpendicular to the light incidence surface of the light guide member 5 upon which light from the light sources is incident and the light guide member's side surface extending along a major axis direction (i.e., the scanning direction) of the light guide member (in FIG. 16, the angle of each oblique side slanting against a line perpendicular to the base) is expressed as θ.

Hereafter, optimum values of θ will be shown in detail. Illumination distributions in the subscanning direction in the cases of θ=3 degrees, 5 degrees, and 7 degrees are shown in FIGS. 17(a), 17(b), and 17(c), respectively. In the case of θ=3 degrees, while the illumination distribution in the subscanning direction has much the same intensity of illuminance at the center position in any of the cases of d=0 mm, d=1 mm, and d=2 mm, the region with a uniform intensity of illuminance in the subscanning direction becomes narrow in the case of d=2 mm. In contrast, in the case of θ=7 degrees, while the region with a uniform intensity of illuminance in the subscanning direction becomes wider to about 13 mm in any of the cases of d=0 mm, d=1 mm, and d=2 mm, the intensity of illuminance in the depth direction has variations of about ±10%. Therefore, it is desirable that θ has a region whose center is at 5 degrees. When the permissible range of variations in the intensity of illuminance in the depth direction is set to ±20% or less and the permissible range of variations in the intensity of illuminance in the subscanning direction within a region of 11 mm from the center is set to 20% or less, it is preferable to set θ to range from 3 degrees to 10 degrees. When the permissible range of variations in the intensity of illuminance in the depth direction is set to ±10% or less and the permissible range of variations in the intensity of illuminance in the subscanning direction within the region of 11 mm from the center is set to 10% or less, it is preferable to set θ to range from 3 degrees to 7 degrees.

Figure 17:
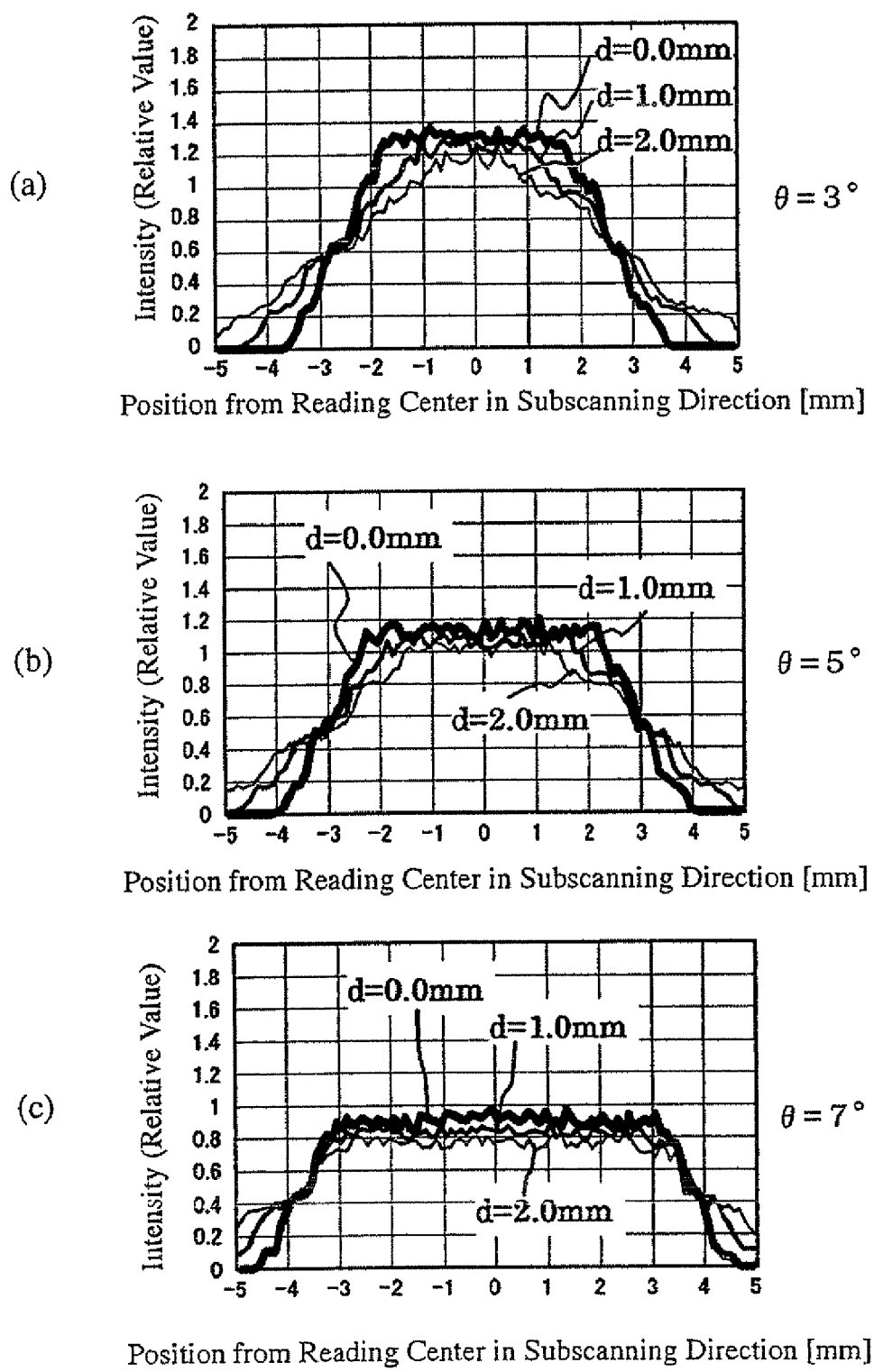
FIG. 17 is a diagram showing calculation results of an illumination distribution in a case in which 9 of the light guide member in accordance with Embodiment 3 of the present invention is changed.

FIG. 17 shows calculation results in a case in which the thickness of the second cover glass 3 is 2 mm and d=0 to 2 mm, and, as can be seen from this figure, by making the distance between the document reading position and the light emitting surface of the light guide member range from at least 1.4 mm to 3.4 mm in terms of optical length, and by making θ range from 3 degrees to 10 degrees, and by desirably making θ range from 3 degrees to 7 degrees, the reading accuracy of the apparatus can be improved. Furthermore, because the cylindrical lens array 13 is formed in the light emitting surface of the light guide member 5, even when there is no document in the image reading apparatus, an illumination distribution in the scanning direction with a small amount of illuminance variations can be observed Even when the distance between the document reading position and the light emitting surface of the light guide member differs from the examples shown in FIG. 17, by setting above-mentioned 9 to have a predetermined angle, the intensity of illuminance in a region which is close to the document reading position can be made uniform in both the depth direction and the subscanning direction, and, even if the position of the document is changed in a region including the document reading position, the same intensity of illuminance can be provided and therefore the light and shade of the document can be detected correctly.

Each of the above-mentioned embodiments is explained assuming that the LEDs which are the light sources have only one color. As an alternative, LEDs of plural colors can be arranged in order to enable the image reading apparatus to read a colored document. In this case, the pitch L of the LEDs differs for every color.

In each of the above-mentioned embodiments, the structure in which the rod lens array is provided as the reading optical system is shown. As an alternative, a combination of a plurality of lenses and a plurality of mirrors can be disposed as the reading optical system, and the same advantages can be provided.

The invention claimed is:

1. An image reading apparatus reading, as respective targets, light passing through respective images on respective documents, each document scattering and transmitting incident light, said image reading apparatus comprising:
    an illuminating optical system having
        a plurality of light sources arranged in a line along a scanning direction of a document when present in said image reading apparatus, and
        a light guide member for guiding rays of light from said plurality of light sources through said light guide member;
    a document conveying control system for conveying documents through said image reading apparatus in a subscanning direction, perpendicular to the scanning direction, and for passing the documents through a document reading position located near a light emergent surface of said light guide member from which the rays of light from said plurality of light sources emerge;
    an image reading optical system comprising:
        a plurality of image formation optical systems and a plurality of light detecting elements, which are aligned in the scanning direction, for
            detecting the rays of light which pass through documents, when a document is present at the document reading position, and
            detecting intensity of the rays of light, in the scanning direction, when no document is present at the document reading position; and a cylindrical lens array having a plurality of ridge lines, each ridge line running along the subscanning direction, the plurality of ridge lines being aligned in the scanning direction, and located in said light emergent surface of the light guide member from which the rays of light from said plurality of light sources emerge.

2. The image reading apparatus according to claim 1, wherein the document reading position is located at a distance ranging from 1.4 mm to 3.4 mm, in terms of optical length, from said light emergent surface of said light guide member.

3. The image reading apparatus according to claim 1, wherein
said cylindrical lens array includes a plurality of contiguous cylindrical lenses, and
adjacent pairs of said cylindrical lenses are in contact with each other at respective side planes which are parallel to and located at respective ridge lines of said cylindrical lens array.

4. The image reading apparatus according to claim 3, wherein, in said cylindrical lens array,
said cylindrical lenses are arranged at a pitch P,
each of said cylindrical lenses has a radius of curvature R, and
P/R ranges from 1.3 to 2.85.

5. The image reading apparatus according to claim 3, wherein, in said cylindrical lens array,
said cylindrical lenses are arranged at a pitch P,
each of said cylindrical lenses has a radius of curvature R, and
P/R ranges from 1.6 to 2.3.

6. The image reading apparatus according to claim 1, wherein
said light guide member has a trapezoidal shape, in a cross-sectional plane perpendicular to the scanning direction, and
the trapezoidal cross-sectional shape of said light guide member has a narrowest side facing said light sources.

7. The image reading apparatus according to claim 6, wherein
said light emergent surface of said light guide member, from which the light from said light sources emerges, is spaced from the document reading positioner by a distance ranging from 1.4 mm to 3.4 mm, in optical length, and
a surface perpendicular to a light incidence surface of said light guide member, upon which the light from said light sources is incident, intersects and forms an angle θ with a side surface of said light guide member, at a line that extends along the scanning direction, and the angle θ ranges from 3 degrees to 10 degrees.

8. An image reading apparatus including:
an illuminating optical system having
a plurality of light sources arranged in a line along a scanning direction of a document;
a light guide member for guiding rays of light from said plurality of light sources through said light guide member;
a document conveying control system for conveying the document in a subscanning direction, perpendicular to the scanning direction, and for passing the document through a document reading position located near a light emergent surface of said light guide member and from which the rays of light from said plurality of light sources emerge;
an image reading optical system comprising
a plurality of image formation optical systems, and
a plurality of light detecting elements which are aligned in the scanning direction, for detecting light passing through the document at the document reading position, wherein variations in intensity of illuminance in the scanning direction of a light signal, which is detected by said image reading optical system, are no more than 10% when a document is present in the document reading position, and are at least 10% when no document is present in the document reading position; and
a cylindrical lens array arranged so that the variations in the intensity of illuminance is no more than 10% when no document is present in the document reading position.

9. The image reading apparatus according to claim 8, wherein the document reading position is located at a distance ranging from 1.4 mm to 3.4 mm, in terms of optical length, from said light emergent surface of said light guide member.

10. The image reading apparatus according to claim 9, wherein, in said cylindrical lens array,
said cylindrical lenses are arranged at a pitch P,
each of said cylindrical lenses has a radius of curvature R, and
P/R ranges from 1.3 to 2.85.

11. The image reading apparatus according to claim 9, wherein, in said cylindrical lens array,
said cylindrical lenses are arranged at a pitch P,
each of said cylindrical lenses has a radius of curvature R, and
P/R ranges from 1.6 to 2.3.

12. The image reading apparatus according to claim 8, wherein
said cylindrical lens array includes a plurality of contiguous cylindrical lenses, and
adjacent pairs of said cylindrical lenses are in contact with each other at respective side planes which are parallel to and located at respective ridge lines of said cylindrical lens array.

13. The image reading apparatus according to claim 8, wherein
said light guide member has a trapezoidal shape, in a cross-sectional plane perpendicular to the scanning direction, and
the trapezoidal cross-sectional shape of said light guide member has a narrowest side facing said light sources.

14. The image reading apparatus according to claim 13, wherein
said light emergent surface of said light guide member, from which the light from said light sources emerges, is spaced from the document reading position by a distance ranging from 1.4 mm to 3.4 mm, in optical length, and
a surface perpendicular to a light incidence surface of said light guide member, upon which the light from said light sources is incident, intersects and forms an angle θ with a side surface of said light guide member, at a line that extends along the scanning direction, and the angle θ ranges from 3 degrees to 10 degrees.

15. An image reading apparatus comprising:
an illuminating optical system including, sequentially arranged,
a plurality of light sources arranged in a line along a scanning direction of a document, and
a light guide member for guiding rays of light from said plurality of light sources through said light guide member to a light emergent surface of said light guide member, said light emergent surface of said light guide member including a cylindrical lens array having a plurality of ridge lines, each ridge line running along a document subscanning direction, the plurality of ridge lines being aligned in a document scanning direction;

a document conveying control system for conveying the document through said image reading apparatus in the document subscanning direction, perpendicular to the document scanning direction, and for passing the document through a document reading position; and an image reading optical system comprising a plurality of image formation optical systems and a plurality of light detecting elements, which are aligned in the scanning direction, for detecting light passing through the document at the document reading position, wherein said illuminating optical system and said image reading optical system are on opposite sides of and sandwich the document reading position of said document conveying control system.

16. The image reading apparatus according to claim 15, wherein the document reading position is located at a distance ranging from 1.4 mm to 3.4 mm, in terms of optical length, from said light emergent surface of said light guide member.

17. The image reading apparatus according to claim 16, wherein, in said cylindrical lens array,
said cylindrical lenses are arranged at a pitch P,
each of said cylindrical lenses has a radius of curvature R, and
P/R ranges from 1.3 to 2.85.

18. The image reading apparatus according to claim 15, wherein
said cylindrical lens array includes a plurality of contiguous cylindrical lenses, and
adjacent pairs of said cylindrical lenses are in contact with each other at respective side planes which are parallel to and located at respective ridge lines of said cylindrical lens array.

19. The image reading apparatus according to claim 15, wherein
said light guide member has a trapezoidal shape, in a cross-sectional plane perpendicular to the scanning direction, and
the trapezoidal cross-sectional shape of said light guide member has a narrowest side facing said light sources.

20. The image reading apparatus according to claim 19, wherein
said light emergent surface of said light guide member, from which the light from said light sources emerges, is spaced from the document reading position by a distance ranging from 1.4 mm to 3.4 mm, in optical length, and
a surface perpendicular to a light incidence surface of said light guide member, upon which the light from said light sources is incident, intersects and forms an angle $\theta$ with a side surface of said light guide member, at a line that extends along the scanning direction, and the angle $\theta$ ranges from 3 degrees to 10 degrees.

* * * * *